United States Patent
Flammer, III

(10) Patent No.: US 9,584,179 B2
(45) Date of Patent: Feb. 28, 2017

(54) SYSTEM AND METHOD FOR MULTI-CHANNEL FREQUENCY HOPPING SPREAD SPECTRUM COMMUNICATION

(75) Inventor: George H. Flammer, III, Cupertino, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 838 days.

(21) Appl. No.: 13/403,848

(22) Filed: Feb. 23, 2012

(65) Prior Publication Data

US 2013/0223351 A1   Aug. 29, 2013

(51) Int. Cl.
*H04B 1/713*    (2011.01)
*H04W 72/04*   (2009.01)
*H04W 76/02*   (2009.01)
*H04W 84/18*   (2009.01)

(52) U.S. Cl.
CPC ......... *H04B 1/713* (2013.01); *H04W 72/0406* (2013.01); *H04W 76/025* (2013.01); *H04W 84/18* (2013.01)

(58) Field of Classification Search
CPC ............. H04W 4/005; H04W 72/0406; H04W 72/0453; H04W 74/04; H04W 74/06; H04W 74/08; H04W 74/0816; H04W 76/025; H04W 84/12; H04W 84/18; H04L 5/0012; H04L 5/0023; H04L 5/0055; H04L 5/006; H04L 29/06; H04L 29/12018; H04L 67/12; H04L 69/14; H04L 69/16; H04B 1/713; H04B 1/7143; H04B 1/7136; H04B 7/0452; H04B 2001/71323; H04B 7/7154

See application file for complete search history.

(56) References Cited

U.S. PATENT DOCUMENTS

| 4,990,924 A | 2/1991 | McMullen et al. |
| 5,497,508 A | 3/1996 | George |
| 6,118,805 A | 9/2000 | Bergstrom et al. |

(Continued)

FOREIGN PATENT DOCUMENTS

| EP | 1-526-692 A2 | 4/2005 |
| EP | 1-793-637 A1 | 6/2007 |

OTHER PUBLICATIONS

Petros Spachos et al., "Performance Comparison of Opportunistic Routing Schemes in Wireless Sensor Networks," Communication Networks and Services Research Conference (CNSR), 2011 Ninth Annual, IEEE, May 2, 2011, pp. 271-277. XP031869921, DOI: 10.1109/CNSR.2011.46 ISBN: 978-1-4577-0040-8.

(Continued)

*Primary Examiner* — Michael Thier
*Assistant Examiner* — Eric Nowlin
(74) *Attorney, Agent, or Firm* — Artegis Law Group, LLP

(57) ABSTRACT

One embodiment of the present invention sets forth a technique for transmitting data in a frequency hopping spread spectrum (FHSS) wireless communication system. A multi-channel receiver is configured to receive data from one or more channels simultaneously. The multi-channel receiver enables efficient implementation of a transmission protocol in which multiple candidate nodes within a wireless mesh network are polled for availability to receive a packet of data. The packet of data is transmitted to one or more available nodes based on prevailing link conditions, thereby increasing the likelihood of successful delivery. Data flooding may be selectively implemented to further increase the likelihood of successful delivery.

36 Claims, 10 Drawing Sheets

(56) References Cited

U.S. PATENT DOCUMENTS

| | | | | |
|---|---|---|---|---|
| 6,301,514 | B1* | 10/2001 | Canada et al. | 700/108 |
| 7,852,786 | B2* | 12/2010 | Wang et al. | 370/254 |
| 7,983,230 | B1* | 7/2011 | Li et al. | 370/338 |
| 8,248,999 | B2* | 8/2012 | Gossain et al. | 370/329 |
| 8,832,302 | B1* | 9/2014 | Bradford et al. | 709/232 |
| 8,984,361 | B2* | 3/2015 | Wang | H04B 7/2606 714/748 |
| 2001/0017899 | A1 | 8/2001 | Milway | |
| 2003/0045294 | A1* | 3/2003 | Kumar | H04W 4/02 455/444 |
| 2004/0141489 | A1* | 7/2004 | Benveniste | 370/345 |
| 2004/0156353 | A1* | 8/2004 | Bevan et al. | 370/351 |
| 2005/0002364 | A1* | 1/2005 | Ozer et al. | 370/338 |
| 2005/0130656 | A1* | 6/2005 | Chen | 455/436 |
| 2005/0271006 | A1* | 12/2005 | Chari et al. | 370/329 |
| 2005/0286440 | A1* | 12/2005 | Strutt et al. | 370/253 |
| 2006/0050742 | A1* | 3/2006 | Grandhi et al. | 370/506 |
| 2006/0056338 | A1* | 3/2006 | Abe | H04B 7/026 370/328 |
| 2007/0002821 | A1* | 1/2007 | Carlson et al. | 370/349 |
| 2008/0279093 | A1* | 11/2008 | Hassan et al. | 370/216 |
| 2008/0304485 | A1* | 12/2008 | Sinha et al. | 370/392 |
| 2009/0022093 | A1* | 1/2009 | Nabar et al. | 370/328 |
| 2009/0086706 | A1* | 4/2009 | Huang et al. | 370/349 |
| 2009/0292965 | A1* | 11/2009 | Park et al. | 714/750 |
| 2010/0040042 | A1* | 2/2010 | van Greunen et al. | 370/350 |
| 2010/0311432 | A1* | 12/2010 | Lauer et al. | 455/450 |
| 2011/0007896 | A1* | 1/2011 | Chen | 380/33 |
| 2011/0103299 | A1* | 5/2011 | Shuey | 370/328 |
| 2011/0124284 | A1* | 5/2011 | Adam et al. | 455/7 |
| 2011/0228742 | A1* | 9/2011 | Honkasalo et al. | 370/330 |
| 2011/0317633 | A1* | 12/2011 | Tan et al. | 370/329 |
| 2012/0008599 | A1* | 1/2012 | Marin et al. | 370/336 |
| 2012/0051335 | A1* | 3/2012 | Kimura et al. | 370/336 |

OTHER PUBLICATIONS

International Search Report PCT/US2013/027370 dated Sep. 12, 2013.

* cited by examiner

SYSTEM AND METHOD FOR MULTI-CHANNEL FREQUENCY HOPPING SPREAD SPECTRUM COMMUNICATION

BACKGROUND

Technical Field

Embodiments of the present invention relate generally to wireless digital communication systems and methods and, more specifically, to a system and method for multi-channel frequency hopping spread spectrum communication.

Description of the Related Art

A conventional wireless mesh network includes a plurality of nodes, each incorporating a digital radio transceiver. A given node may transmit payload data to one or more other nodes via the digital radio transceiver. The node may originate the payload data or forward the payload data on behalf of another node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network.

The digital radio transceiver may implement specific modulation and spectral utilization techniques to satisfy a particular set of technical requirements. For example, frequency hopping spread spectrum (FHSS) may be implemented to avoid potentially excessive interference among nodes that are attempting to transmit on a common radio frequency channel in an arbitrary window of time. FHSS involves transmitting data on one radio frequency channel for up to a specified maximum time duration and subsequently transmitting on a different radio frequency channel for up to another specified maximum time duration. FHSS systems typically follow a specific channel hop sequence, which both the transmitter and receiver need to follow to maintain a reliable communications channel. The transmitter reduces average radio frequency energy associated with a given channel by hopping to a different channel after a specified maximum time duration, thereby reducing a probability of interference among nodes attempting to transmit on the same channel.

FHSS systems conventionally require the transmitter and receiver pair to be synchronized, which is typically accomplished via a synchronization procedure conducted between the transmitter and receiver. Overhead associated with the synchronization procedure and related transmission latencies can substantially reduce overall transmission efficiency and network throughput.

One challenge in implementing a wireless mesh network is achieving sufficient overall throughput and latency specifications. Overall throughput and latency are generally a function of overall utilization, link error rates, link bandwidth, and link transmission latency. As utilization increases, channel collision probabilities increase, leading to multiple dropped packets, which in turn result in additional overall utilization from transmission retry mechanisms. FHSS in wireless mesh networks offers certain benefits, including regulatory compliance in certain scenarios. However, inefficiencies associated with FHSS, such as transmission latency and synchronization overhead can significantly diminish overall network throughput and increase average link transmission latencies. In certain wireless mesh network applications, FHSS is required by prevailing regulations and overall network throughput and average latencies suffer from the above described inefficiencies.

As the foregoing illustrates, what is needed in the art is a more efficient technique for transmission in an FHSS wireless mesh network environment.

SUMMARY

One embodiment of the present invention sets forth a method for forwarding a packet of data from a source node to a destination node within a wireless network via a target node, the method comprising receiving from the source node a poll message via a first channel within a plurality of simultaneously monitored channels that requests availability information for the target node, transmitting an acknowledgement message to the source node that includes the availability information for the target node, receiving a data message from the source node that includes payload data to be forwarded to a next-hop node within the wireless network, transmitting a data-acknowledge message to the source node indicating successful receipt of the data message, and forwarding the payload data to the next-hop node.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
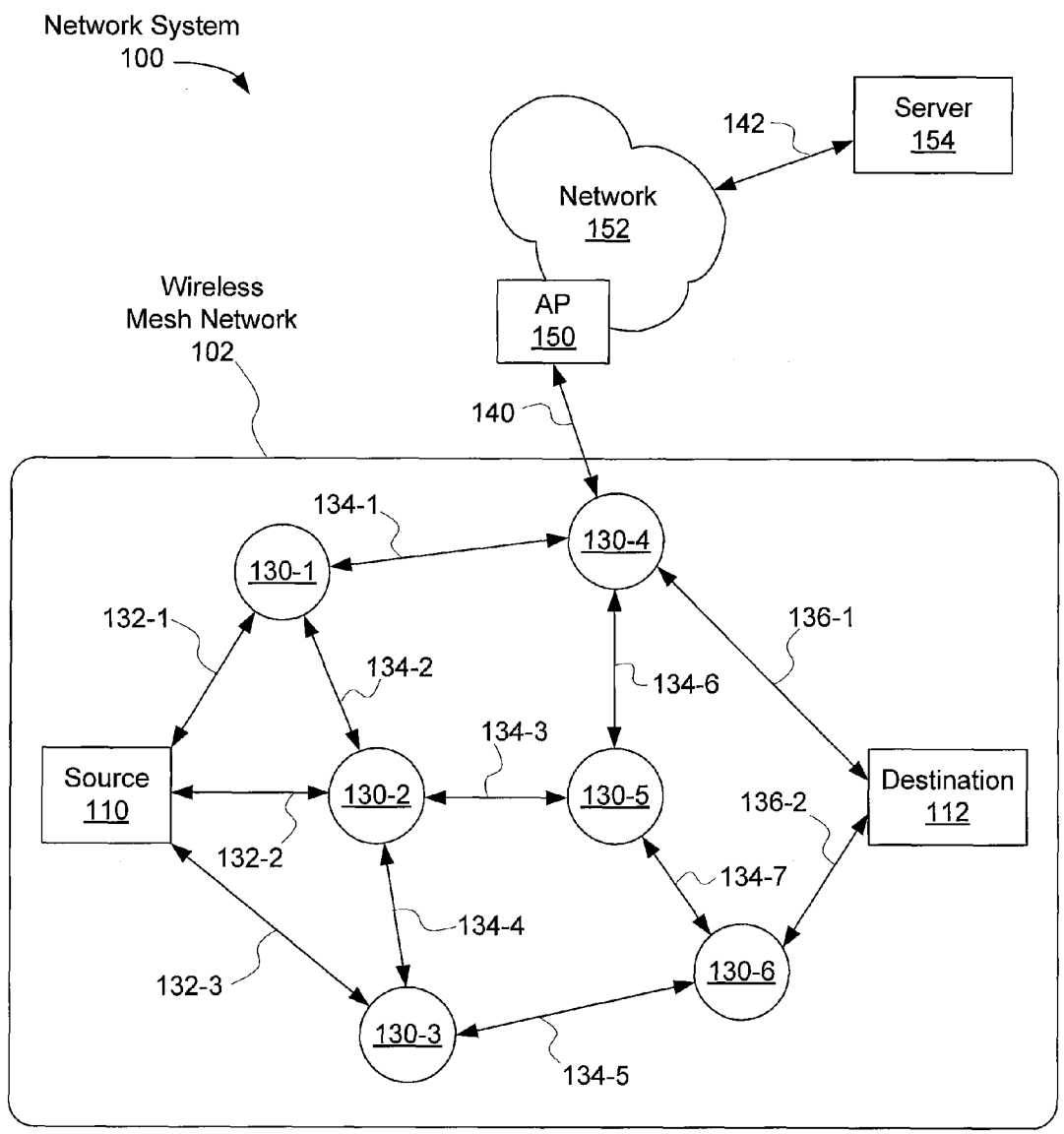
FIG. 1 illustrates a general wireless mesh network, configured to implement one or more aspects of the present invention.

FIG. 1 illustrates a network system 100, configured to implement one or more aspects of the present invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, configured to communicate with at least one node 130 via communications link 140, a network 152, and a server 154.

Any node 110, 112, 130, 150 may initiate a discovery protocol implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, when a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address. Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

As shown, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The access point 150 is coupled to the network 152, which may comprise any wired, optical, wireless, or hybrid network configured to transmit payload data between the access point 150 and the server 154. In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status, data regarding proper performance, and so forth. In an alternative embodiment, each node within the wireless mesh network 102 autonomously reports certain data, which is collected by the 154 as the data becomes available via autonomous reporting.

Figure 2:
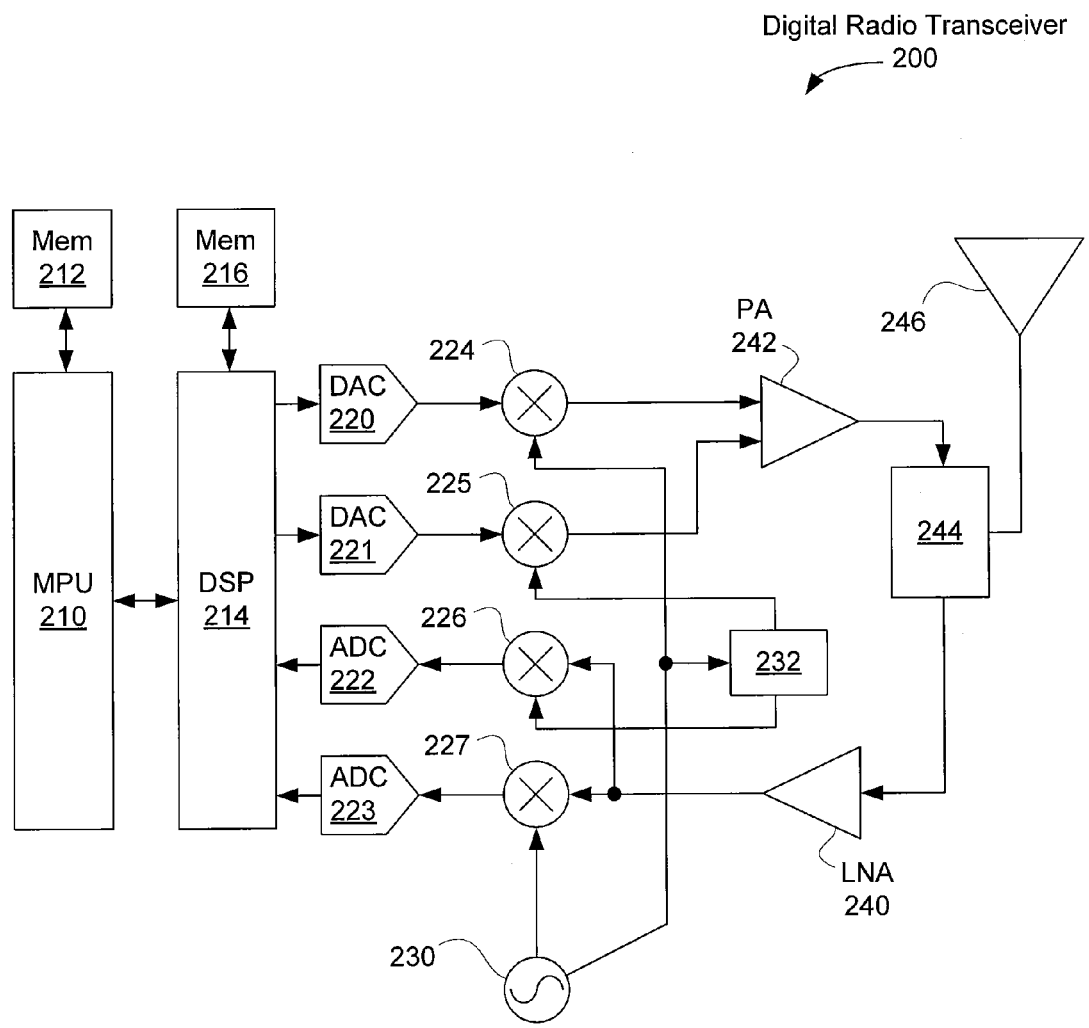
FIG. 2 illustrates a radio transceiver configured to implement multi-channel operation, according to one embodiment of the invention.

FIG. 2 illustrates a digital radio transceiver 200 configured to implement multi-channel operation, according to one embodiment of the invention. Each node 110, 112, 130 within the wireless mesh network 102 of FIG. 1 includes at least one instance of the digital radio transceiver 200. The digital radio transceiver 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage.

In one embodiment, the MPU 210 implements procedures for processing IP packets transmitted or received as payload data by the digital radio transceiver 200. The procedures for processing the IP packets may include, without limitation, wireless routing, encryption, authentication, protocol translation, and routing between and among different wireless and wired network ports. The MPU 210 may also implement a packet transmission protocol, such as a four step transmission protocol discussed in greater detail below in FIGS. 4A and 4B. Alternatively, the DSP 214 may implement the four step transmission protocol.

The DSP 214 implements signal processing procedures for modulating a serialized representation of payload data comprising packets, such as IP packets, for wireless transmission. The serialized representation may encode one or more bits of payload data per modulation symbol. A receiver may demodulate each modulation symbol to recover the one or more bits of payload data. In one embodiment the one or more bits of payload data are used to generate a corresponding IP packet. The DSP 214 may also implement multi-channel modulation for simultaneous transmission of independent units of payload data via multiple, independent channels. Each independent channel occupies a different frequency range in a frequency domain representation of a transmitted radio signal. The DSP 214 also implements signal processing procedures for receiving payload data, such as payload data comprising IP packets. The procedures may include, without limitation filtering, energy detection, signal characterization, and simultaneous demodulation of multiple, independent channels.

In one embodiment, the DSP 214 is configured to modulate data within a given channel using a particular modulation technique that is selected form a set of different modulation techniques, based on prevailing channel requirements. For a given packet of data, a particular transmission bit rate may be implemented using one of the different modulation techniques, based on channel conditions. For example, if a selected channel is subjected to a relatively large amount of noise, then a lower bit rate modulation technique that is more tolerant of noise may be selected. Alternatively, if a selected channel is subjected to relatively low noise and low loss, then a higher bit rate modulation technique may be selected despite a potentially reduced noise tolerance. Exemplary modulation techniques known in the art include, without limitation, frequency shift keying (FSK) and quadrature amplitude modulation (QAM). FSK may be implemented as a robust, but relatively low bit rate technique for representing one or more bits of data per modulation symbol as signal energy in at least one of two or more defined frequency bands. QAM may be implemented as a relatively high bit rate technique for representing a set of two or more bits per modulation symbol within an amplitude-phase space. Each possible value represented by the two or more bits is mapped to a unique region within the amplitude-phase space. A collection of regions within the amplitude-phase space is known as a constellation. During modulation, each set of two or more bits comprising a modulation symbol is encoded and mapped to an appropriate region within a corresponding constellation. Persons skilled in the art will understand that quadrature encoded signal pairs may be used to conveniently implement QAM modulation. Furthermore, any technically feasible modulation, demodulation, filtering, energy detection, and signal characterization techniques may be implemented by the DSP 214 without departing the scope and spirit of embodiments of the present invention.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, the DSP 214 generates two modulated streams of outbound digital values, which are converted to corresponding analog quadrature signals by DACs 220, 221. The analog quadrature signals are separately mixed with a radio frequency (RF) carrier signal by analog mixers 224, 225 to generate corresponding quadrature RF signals, each having a frequency domain image centered about the frequency of the RF carrier signal. Oscillator 230 generates the RF carrier signal and phase shifter 232 generates a 90-degree shifted representation of the RF carrier signal for generating quadrature RF signals. The PA 242 combines the quadrature RF signals to generate a modulated RF signal, which is coupled through the antenna switch 244 to the antenna 246. The antenna 246 converts the modulated RF signal from an electrical representation to an electromagnetic representation for wireless transmission. The wireless transmission may be directed to a different instance of the digital radio transceiver 200, residing within a different node of the wireless mesh network 102.

When the digital radio transceiver 200 is receiving data, the antenna 246 converts an incoming electromagnetic RF signal to an electrical RF signal, which is coupled through the antenna switch 244 to the LNA 240. The LNA 240 amplifies the electrical RF signal and couples the amplified RF signal to analog mixers 226 and 227. The amplified RF signal is characterized as having a signal image centered about an RF carrier frequency. The analog mixer 227 shifts the signal image down in frequency to an in-phase baseband component of the signal image. The signal is in-phase with respect to the RF carrier signal generated by oscillator 230. The analog mixer 226 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. The DSP 214 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, the oscillator 230 can be programmed to generate one selected frequency from a plurality of possible frequencies. Each of the plurality of frequencies corresponds to a different channel. The selected frequency determines a center channel for a range of channels that are concurrently available to the DSP 214 or receiving or transmitting data. For example, if a frequency range of 5 MHz defines fifty channels, and each channel is allocated a bandwidth of 100 kHz, then the selected frequency determines a center channel for five concurrently available channels that are adjacent in frequency. In this example, a frequency range of 500 kHz from the overall frequency range of 5 Mhz is processed by the DSP 214 for transmitting or receiving data on one or more of the five channels. If the oscillator 230 is programmed to generate a different selected frequency, then a different set of five concurrently available channels may be used for transmitting or receiving data. The center channel may be changed arbitrarily by programming the oscillator 230 independently of the DSP 214 operating on the concurrently available channels. The digital radio transceiver 200 may be configured with an arbitrary number of concurrently available channels configured to simultaneously and independently receive or transmit data. Each channel may comprise an arbitrary bandwidth without departing the scope and spirit of embodiments of the present invention.

Figure 3A:
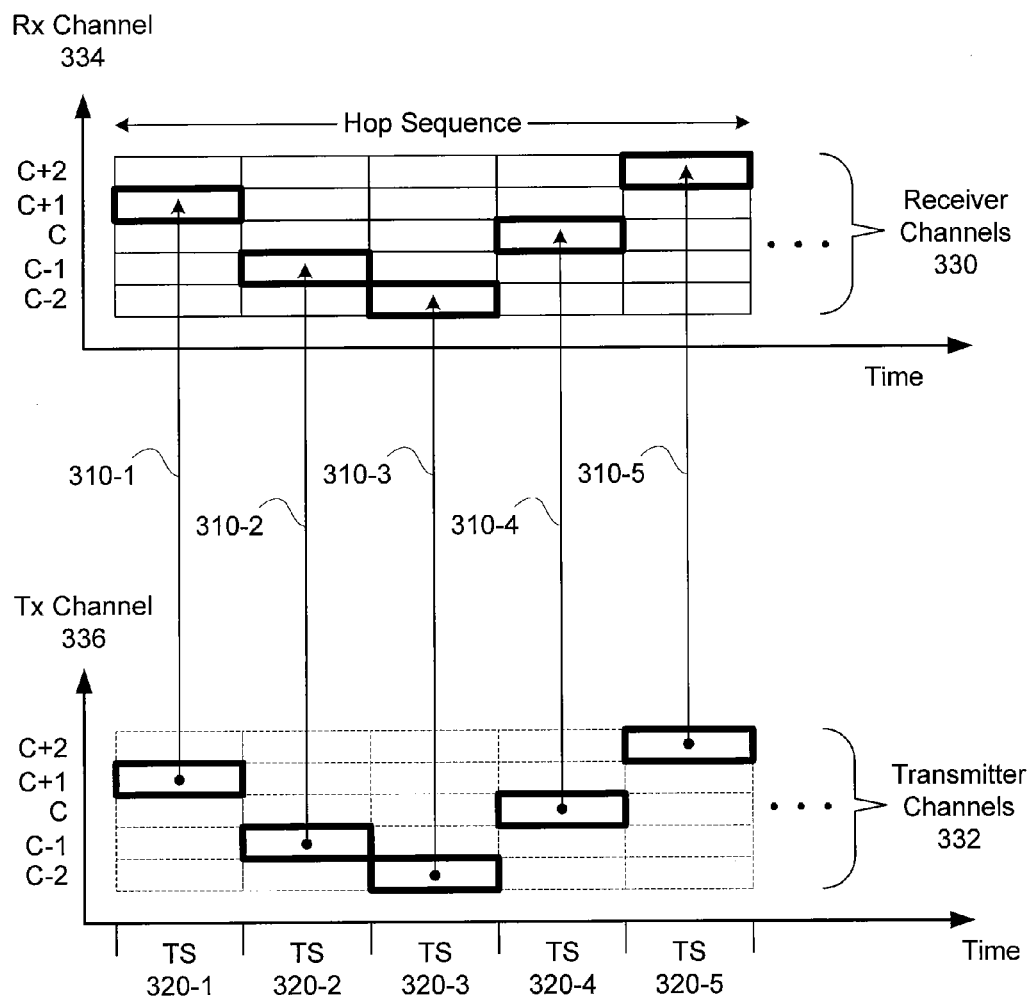
FIG. 3A illustrates a frequency hopping transmission that targets a multi-channel receiver, according to one embodiment of the present invention.

FIG. 3A illustrates a frequency hopping transmission that targets a multi-channel receiver, according to one embodiment of the present invention. A set of five concurrent receive channels 330 is selected, for example, by programming oscillator 230 of FIG. 2 to establish receive channel "C" as the center channel for five channels denoted as C−2, C−1, C, C+1, C+2. Similarly, an identical set of five transmit channels 332 is selected and denoted as C−2, C−1, C, C+1, C+2. The center channel, C, maps to a particular wireless transmission frequency via the frequency of the RF carrier signal generated by oscillator 230.

A first instance of the digital radio transceiver 200 is configured to operate as a transmitter, and a second instance of the digital radio transceiver 200 is configured to operate as a receiver. The transmitter may transmit an RF signal on a particular transmit channel 336 within a time span (TS) 320. Each time span 320 may be specified as a maximum transmission time, after which the transmitter may hop to a different channel to continue transmitting. In one embodiment, the transmitter is configured to transmit on one channel in any given time span 320. In other embodiments, the transmitter is configured to concurrently transmit on two or more channels in a given time span 320.

The receiver is configured to monitor each receive channel C−2 through C+2 within the set of five concurrent receive channels 330. If a data bearing signal is received on one of the concurrent receive channels 330, then the receiver demodulates the signal into a serial data stream. In one embodiment, the serial data stream is parsed and collected into an IP packet, which is processed by the MPU 210. If two or more data bearing signals are received, each on a separate channel, then each one of the two or more data bearing signals is similarly demodulated into an independent serial data stream. In one embodiment, the set of concurrent receive channels 330 is nominally identical to the set of transmit channels 332. In alternative embodiments, the set of concurrent receive channels 330 may be a superset of the transmit channels 332.

As shown, the transmitter frequency-hops in a particular channel sequence. In this example, the channel sequence is {C+1, C−1, C−2, C, C+2} in time spans 320-1, 320-2, 320-3, 320-4, and 320-5, respectively. Payload data 310-1, 310-2, 310-3, 310-4, and 310-5 are transmitted in time spans 320-1, 320-2, 320-3, 320-4, and 320-5, respectively. In one embodiment, payload data 310 transmitted in a given time span 320 comprises at least a portion of an IP packet, such as a whole IP packet or an IP packet fragment.

Importantly, because the receiver is always able to capture and demodulate a data bearing signal within the set of concurrent receive channels 330, hop synchronization with the transmitter is substantially simplified. As a consequence, related overhead and transmission inefficiency is eliminated or greatly mitigated. In one embodiment, each communication link 132, 134, 136, 140 of FIG. 1 is established with a persistent center channel during execution of the discover protocol. In alternative embodiments, a center channel is established dynamically in response to prevailing transmission conditions or via a predetermined hop sequence. Persons skilled in the art will recognize that any technically feasible technique may be implemented to establish a consistent center channel C for the transmitter and receiver without departing the scope and spirit of embodiments of the present invention.

Figure 3B:
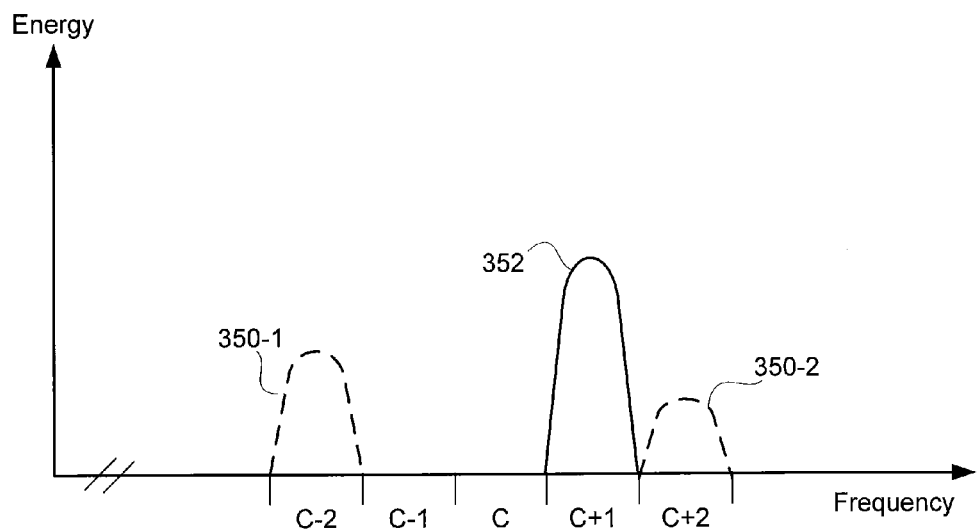
FIG. 3B represents energy within a group of channels for one time span, according to one embodiment of the present invention.

FIG. 3B represents energy within a group of channels for one time span, according to one embodiment of the present invention. As shown, a frequency domain image 352 represents energy associated with channel C+1 during time span 320-1 of FIG. 3A. The receiver is configured to characterize the other frequency domain images 350 to determine whether they represent data bearing signals and should be processed by the receiver or ignored. If one of the frequency domain images 350 is a data bearing signal, then the receiver determines a type for the data bearing signal and demodulates the data bearing signal based on the type. The type may define a modulation technique, bit rate, or any other technically feasible signal characteristic.

Figure 3C:
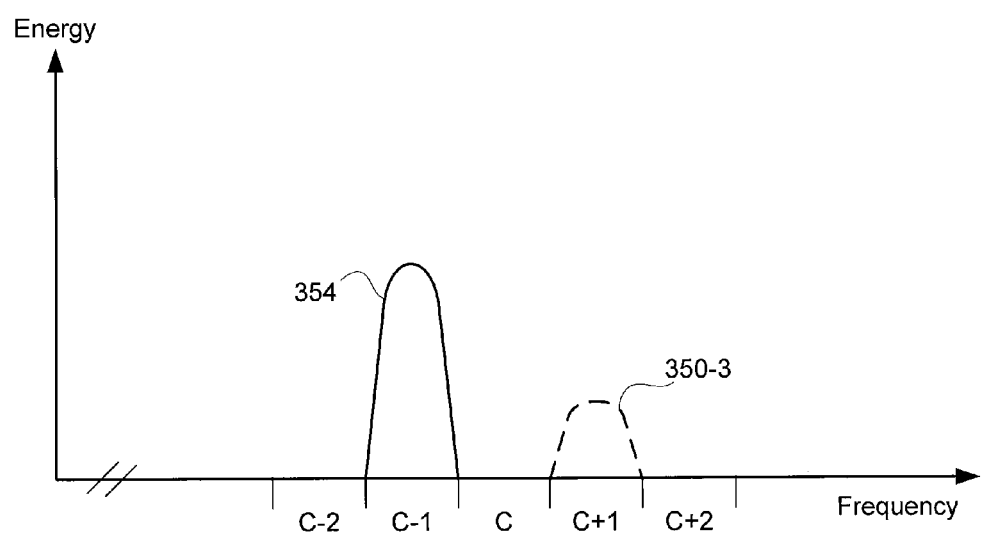
FIG. 3C represents energy within the group of channels for another time span, according to one embodiment of the present invention.

FIG. 3C represents energy within the group of channels for another time span, according to one embodiment of the present invention. As shown, a frequency domain image 354 represents energy associated with channel C−1 during time span 320-2 of FIG. 3A. Frequency domain image 350-3 may represent interference, noise, or a data bearing signal that should be processed.

Figure 3D:
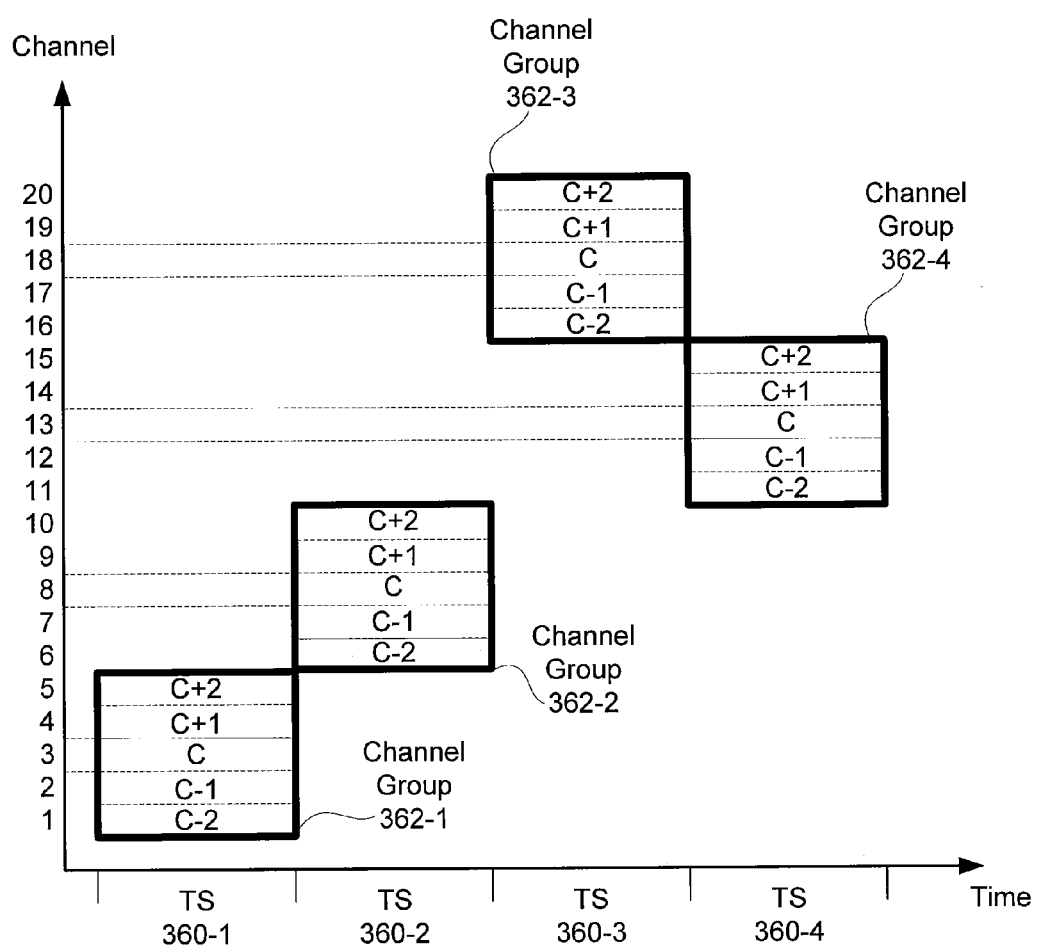
FIG. 3D illustrates channel group hopping, according to one embodiment of the present invention.

FIG. 3D illustrates channel group hopping, according to one embodiment of the present invention. In this example, five concurrently available channels, C−2 through C+2, comprise a channel group 362 that may be mapped onto different allocated channels. An allocated channel is a channel allocated to a particular radio communications service in which digital radio transceiver 200 is configured to operate. Allocated channels may comprise contiguous RF spectrum or non-contiguous RF spectrum, however each channel group 362 should be allocated within substantially contiguous RF spectrum.

In one example, channel group 362-1 comprises allocated channels 1-5, which are processed as available channels C−2 through C+2 by DSP 214. Channel group 362-2 comprises allocated channels 6-10, which are also processed as available channels C−2 through C+2 by DSP 214. In this exemplary channel group hopping sequence, center channel C is sequentially mapped to channel 3, 8, 18, and 13. In one embodiment, oscillator 230 is programmed to establish which channels within an incoming RF signal are translated in frequency domain to map onto available channels C−2 through C+2 for processing by DSP 214. Each channel group 362 may be active for a certain time span (TS) 360. For example, channel groups 362-1 through 362-4 may remain active for time spans 360-1 through 360-4, respectively. Each time span 360 may conform to a specified duration or may be arbitrarily long in duration. For example, a given channel group may remain active until accumulated transmission time requires a certain transmitter to vacate all channels within the current channel group to satisfy regulated transmission time limits.

Any technically feasible technique may be used to select and coordinate a particular channel hopping sequence. In one embodiment, digital radio transceiver 200 explicitly transmits a new center channel on an available channel prior to initiating a hop for a channel group. For example, digital radio transceiver 200 may transmit a message indicating a new center channel 18 prior to transitioning from channel group 362-2 to 362-3. Persons skilled in the art will recognize that this and other techniques may be used to perform channel group hopping without departing the scope and spirit of embodiments of the present invention.

Figure 4A:
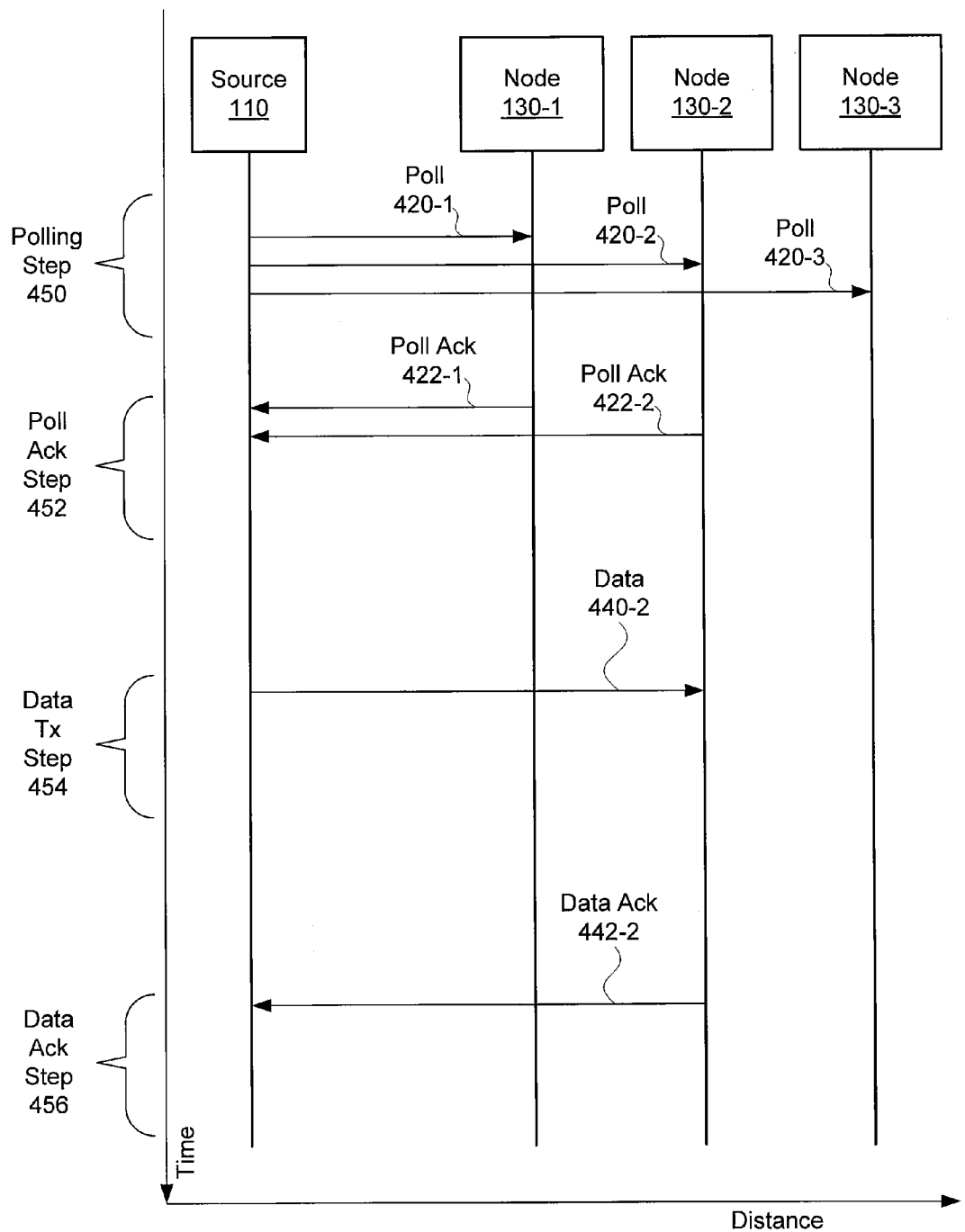
FIG. 4A illustrates a four step communications protocol for transmitting payload data to a single transmission target, according to one embodiment of the present invention.

FIG. 4A illustrates a four step communications protocol for transmitting payload data to a single transmission target, according to one embodiment of the present invention. The communications protocol includes a polling step 450, a poll acknowledgement step 452, a payload data transmission step 454, and a data acknowledgement step 456. In one embodiment, the source node 110 of FIG. 1 is able to transmit payload data via one of a plurality of potential communication links, based, without limitation, on poll acknowledgement data and prevailing transmission conditions sampled during the polling and acknowledgement steps. In this way, an open delivery path may be advantageously selected based on prevailing system conditions.

During the polling step 450, the source node 110 performs a query to adjacent nodes, such as intermediate nodes 130-1, 130-2, and 130-3 to determine which adjacent nodes are able to accept payload data. In one embodiment, the query comprises simultaneously transmitting one or more poll messages 420 to the adjacent nodes. The poll messages 420 may be transmitted to individually target adjacent nodes as shown. Alternatively, the poll messages may be transmitted as one or more broadcast messages to any potentially listening adjacent nodes. During the poll acknowledgement step 452, each adjacent node that is able to accept payload data responds with a poll acknowledgement message 422. In one embodiment, the poll acknowledgement message 422 includes an availability attribute, indicating, without limitation, that the corresponding adjacent node is not able to accept payload data now, but will be able to accept payload data at or after a specified future time. Any technically feasible technique may be implemented for specifying and synchronizing time between nodes within the wireless mesh network 102.

In one embodiment, the source node 110 measures signal strength associated with each poll acknowledgement message 422 as a measure of communication link quality to the corresponding adjacent node. Noise level, bit error rate, or any other technically feasible metric may also be measured to determine communication link quality. A communication link having relatively strong signal strength and relatively low noise is characterized herein as qualitatively "loud." A quantitative loudness characteristic may be computed using signal strength, noise, bit error rate, or any other technically feasible metrics. For example, loudness may be computed as a numerical difference or ratio between signal strength and noise level. The source node 110 may use one or more link qualities, such as loudness, to select an adjacent node as a target for transmission of payload data.

In certain embodiments, each adjacent node performs communication link quality measurements on incoming poll messages 420. Each adjacent node then includes results of the link quality measurements in a corresponding poll acknowledgement message 422. Because noise may be localized to the adjacent node, a link quality measurement taken by the adjacent node is sometimes as significant in determining communication link quality as a noise measurement taken by the source node 110. The source node 110 may consider link quality measurements taken by adjacent nodes to select an adjacent node as a target for transmission of payload data.

In a data transmission step 454, the source node 110 selects an adjacent node and transmits a data message 440-2, comprising payload data, to the selected adjacent node. In a data acknowledgement step 456, the selected adjacent node transmits a data acknowledgement message 442-1 back to the source node 110 to indicate reliable receipt of the data message 440-2.

In the above example, the source node 110 transmits poll messages 420-1, 420-2, and 420-3 to intermediate nodes 130-1, 130-2, and 130-3, respectively. Only intermediate nodes 130-1, 130-2 acknowledge, via poll acknowledgement messages 422-1, 422-2, that they are able to receive payload data. Intermediate node 130-3 did not acknowledge the poll for one or more reasons, including possible scenarios where poll message 420-3 was corrupted in flight, the intermediate node 130-3 was busy, and so forth.

As shown, the source node 110 selects intermediate node 130-2 and transmits data message 440-2 to intermediate node 130-2. Intermediate node 130-2 then acknowledges receipt via data acknowledge message 442-2. After the intermediate node 110 receives and processes the data acknowledge message 442-2, the payload data is deemed to have been successfully transmitted to the intermediate node 130-2. A message may be lost at any step of the four step communications protocol for transmitting payload data. If such a loss occurs, the transmission is considered to have failed. Because a transmission may succeed along one communication link but ultimately fail, and end-to-end protocol should be employed to ensure reliable delivery for packets that require reliable delivery. In one embodiment, the digital radio transceiver 200 implements the well-known transmission communication protocol (TCP) and internet protocol (IP) protocols for transmission of IP packets. The IP packets are mapped into an implementation specific transmission format comprising payload data. Other technically feasible transmission protocols may also be implemented without departing the scope and spirit of embodiments of the present invention.

Source node 110 may transmit one or more poll messages 420, one or more data messages 440, or any combination thereof simultaneously on one or more channels from the available channels. A given node 130 may transmit one or more poll acknowledgement message 422, one or more data acknowledgement messages 442, or any combination thereof simultaneously on one or more channels from the available channels. The node 130 may transmit a poll acknowledgement message 422 on the same channel as a corresponding poll message 420 or on a different available channel from the poll message 420. Similarly, the node 130 may transmit a data acknowledgement message 442 on the same channel as a corresponding data message 440 or on a different available channel from the corresponding data message 440. In one embodiment, node 130 selects a channel for either a poll acknowledgement message 422 or a data acknowledgement message 442 based on channel availability and at least one channel parameter, including, without limitation, energy detected within the available channels, historical transmission success statistics, and local regulatory limits or requirements.

In one usage scenario, node 130 receives multiple data messages 440 from multiple different sources 110 and transmits acknowledgement messages 422, 442 on channels corresponding to data messages being acknowledged. In another usage scenario, node 130 receives multiple data messages 440 from multiple different sources 110 but transmits acknowledgement messages 422, 442 on different channels from the data messages being acknowledged. In yet another usage scenario, node 130 receives multiple data messages 440 from multiple different sources 110, but transmits an aggregated data acknowledgement message indicating successful receipt of at least two different data messages 440 from at least two different sources 110.

Figure 4B:
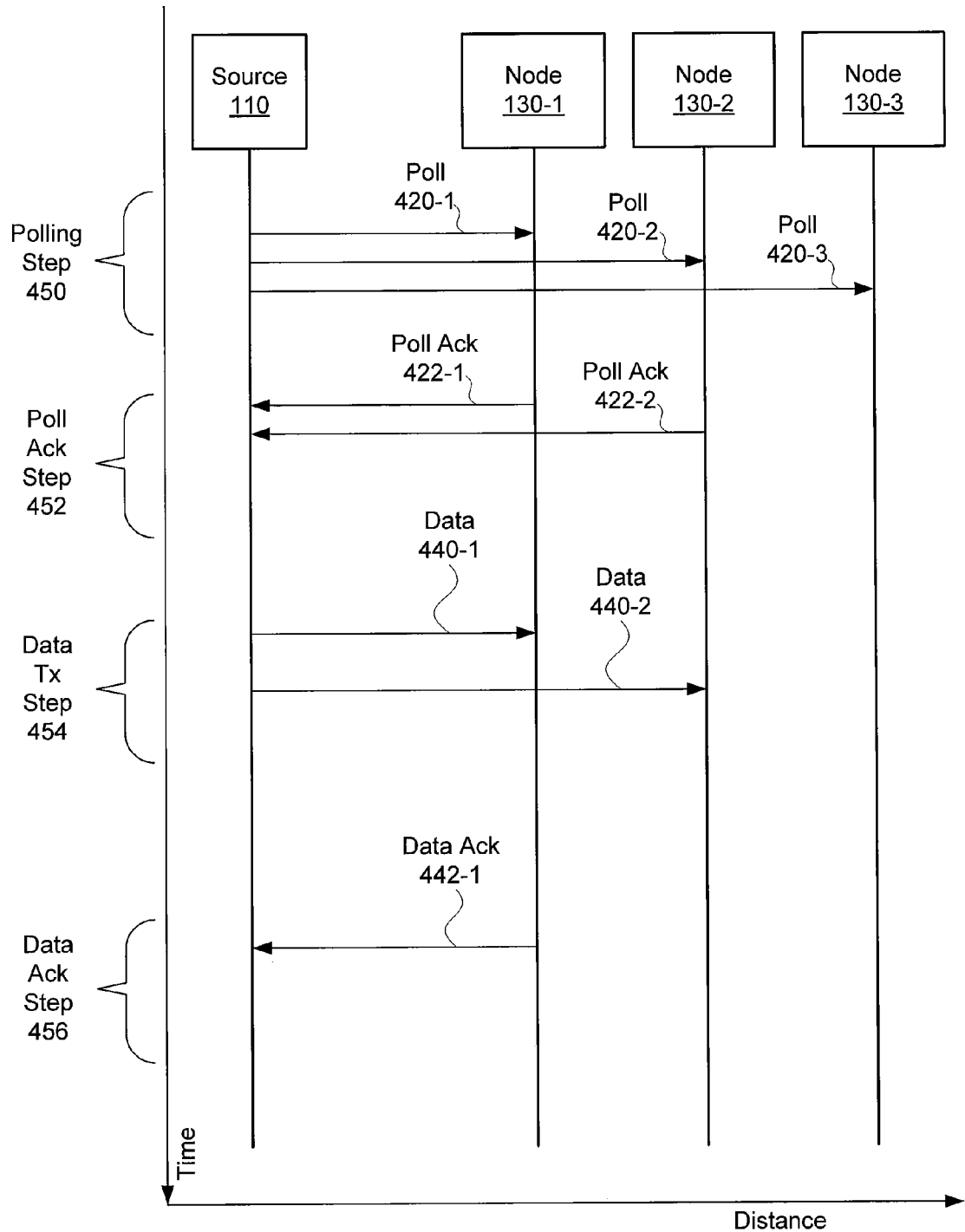
FIG. 4B illustrates a four step communications protocol for transmitting payload data to multiple transmission targets, according to one embodiment of the present invention.

FIG. 4B illustrates a four step communications protocol for transmitting payload data to multiple transmission targets, according to one embodiment of the present invention. As shown, FIG. 4A is extended here to include multiple data messages 440. Specifically, the source node 110 transmits data messages 440-1 and 440-2 to intermediate nodes 130-1 and 130-2, respectively. In this example, data message 440-2 is not successfully transmitted to intermediate node 130-2 and not acknowledged. However, the same payload data was successfully transmitted to intermediate node 130-1. In this example, three polling messages 420-1, 420-2, and 420-3 yielded two poll acknowledgement messages 422-1 and 422-2, which led to two data messages 440-1 and 440-2.

Only one of the data messages 440 was acknowledged via poll acknowledgement message 442-1.

By enabling a receiver to simultaneously receive payload data from multiple transmitters at any time, and without the need to synchronize frequency hopping timing information, greater transmission efficiency is achieved. Polling multiple adjacent nodes for availability increases the probability that one or more adjacent nodes will be available. Having multiple poll results also enables the source node 110 to select among potential adjacent node candidates based on prevailing transmission conditions, thereby increasing the probability of successful delivery to a selected adjacent node. Increasing successful delivery reduces re-tries, which has the effect of increasing overall throughput network capacity. Transmitting multiple instances of payload data, referred to as "flooding" in certain scenarios, yet further increases the probability of successful delivery, but may impact overall network throughput. In one embodiment, certain packets, such as control packets, are marked for high-priority delivery and are transmitted to multiple intermediate nodes 130 from the source node 110. Other packets are not marked for high-priority delivery and are only delivered to one intermediate node from the source node 110.

In one usage scenario, source node 110 is configured to simultaneously transmit two or more poll messages 420 to corresponding nodes 130 on two or more corresponding channels from the available channels. In such a scenario, source node 110 attempts to find at least two different nodes 130 to which two or more data messages 440 may be transmitted. Each of the two or more data messages may comprise the same data payload to increase the likelihood of successful transmission or different data payloads to increase overall throughput. In another usage scenario, source node 110 is configured to simultaneously transmit two or more poll messages 420 to the same node 130 on two or more corresponding channels. In this usage scenario, source node 110 is attempting to find at least one reliable channel within which to transmit a data message 440. Upon receiving two or more poll acknowledgement messages 422, the source node 110 may transmit corresponding copies of the data message 440 to the same node 130. In this usage scenario, source node 110 is attempting to increase the likelihood of a successful transmission. Alternatively, source node 110 may transmit different data messages 440 on the two or more acknowledged channels to the same node 130 to increase transmission throughput.

In one embodiment, node 130 selects a channel for either a poll acknowledgement message 422 or a data acknowledgement message 442 based on channel availability and at least one channel parameter, including, without limitation, energy detected within the available channels, historical transmission success statistics, and local regulatory limits or requirements.

In certain embodiments, the digital radio transceiver 200 is configured to listen to a channel prior to transmitting on the channel in a technique referred to as listen before transmitting (LBT). If the channel is occupied or exhibits significant noise, then a different channel is selected for transmission. Any technically feasible LBT technique may be implemented without departing the scope and spirit of the present invention.

Figure 5:
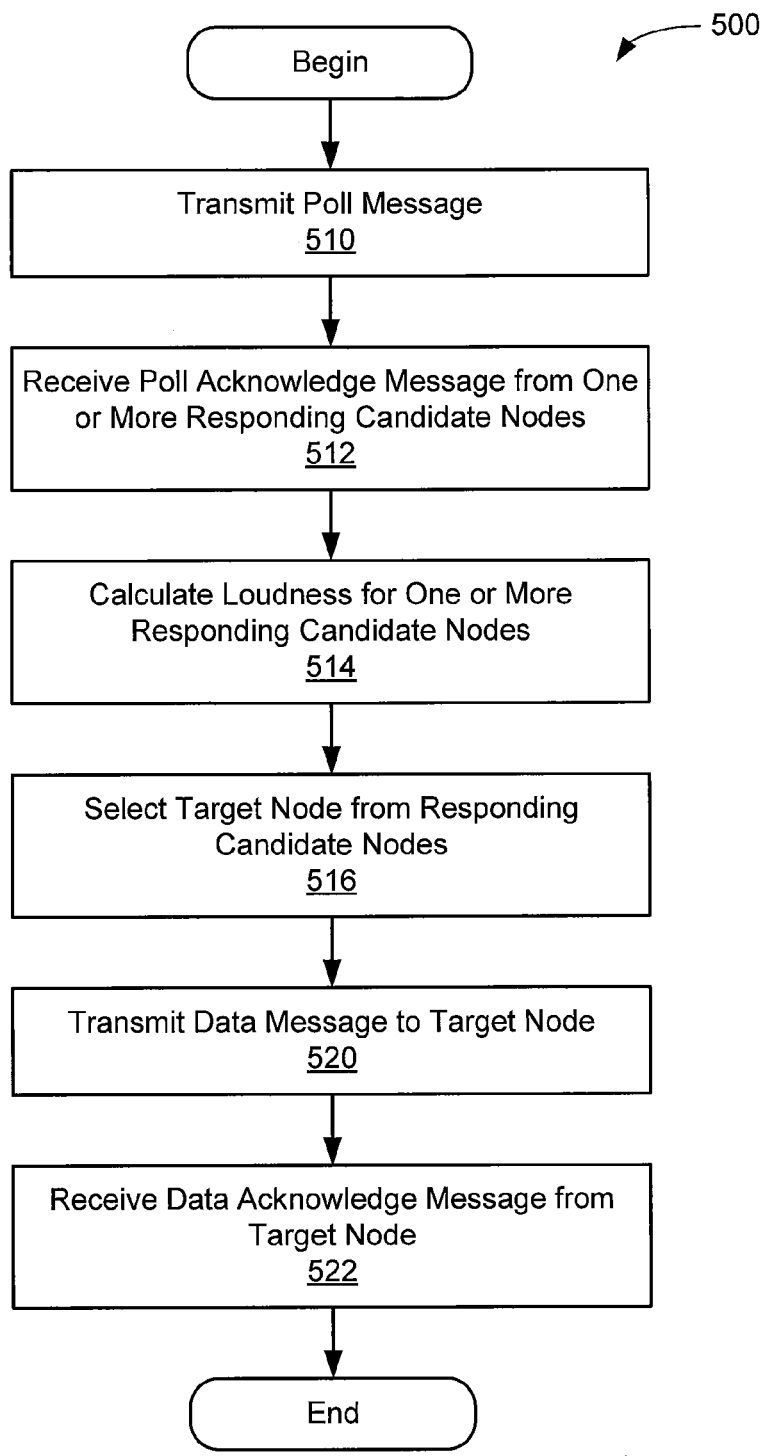
FIG. 5 is a flow diagram of method steps for transmitting payload data via the four step communications protocol, according to one embodiment of the invention.

FIG. 5 is a flow diagram of method steps 500 for transmitting payload data via the four step communications protocol, according to one embodiment of the invention. Although the method steps are described in conjunction with the systems of FIGS. 1 and 2, persons skilled in the art will understand that any system configured to perform the method steps, in any order, is within the scope of the present invention. This method may be performed by the digital radio transceiver 200 or any technically feasible radio transceiver system.

The method begins in step 510, where the digital radio transceiver transmits a poll message to query adjacent nodes to determine their availability as candidates to receive a data transmission. In step 512, the digital radio transceiver receives poll acknowledgement messages from one or more responding candidate nodes. In step 514, the digital radio transceiver calculates loudness for the one or more responding candidate nodes. As described previously, loudness may be computed from measurements performed by the digital radio transceiver, measurements performed by a remote instance of the digital radio transceiver, or any combination thereof. In alternative embodiments, link quality metrics other than loudness may be implemented. In step 516, the digital radio transceiver selects a target node from the one or more responding candidate nodes. In multi-data transmission embodiments, the digital radio transceiver may select one or more additional target nodes, if possible, from the one or more responding candidate nodes.

In step 520, the digital radio transceiver transmits a data message to the selected target node. In multi-data transmission embodiments, the digital radio transceiver transmits the data message to the one or more additional selected target nodes. In step 522, the digital radio transceiver receives a data acknowledgement message, indicating successful delivery of at least one data message. The method terminates in step 522.

Figure 6:
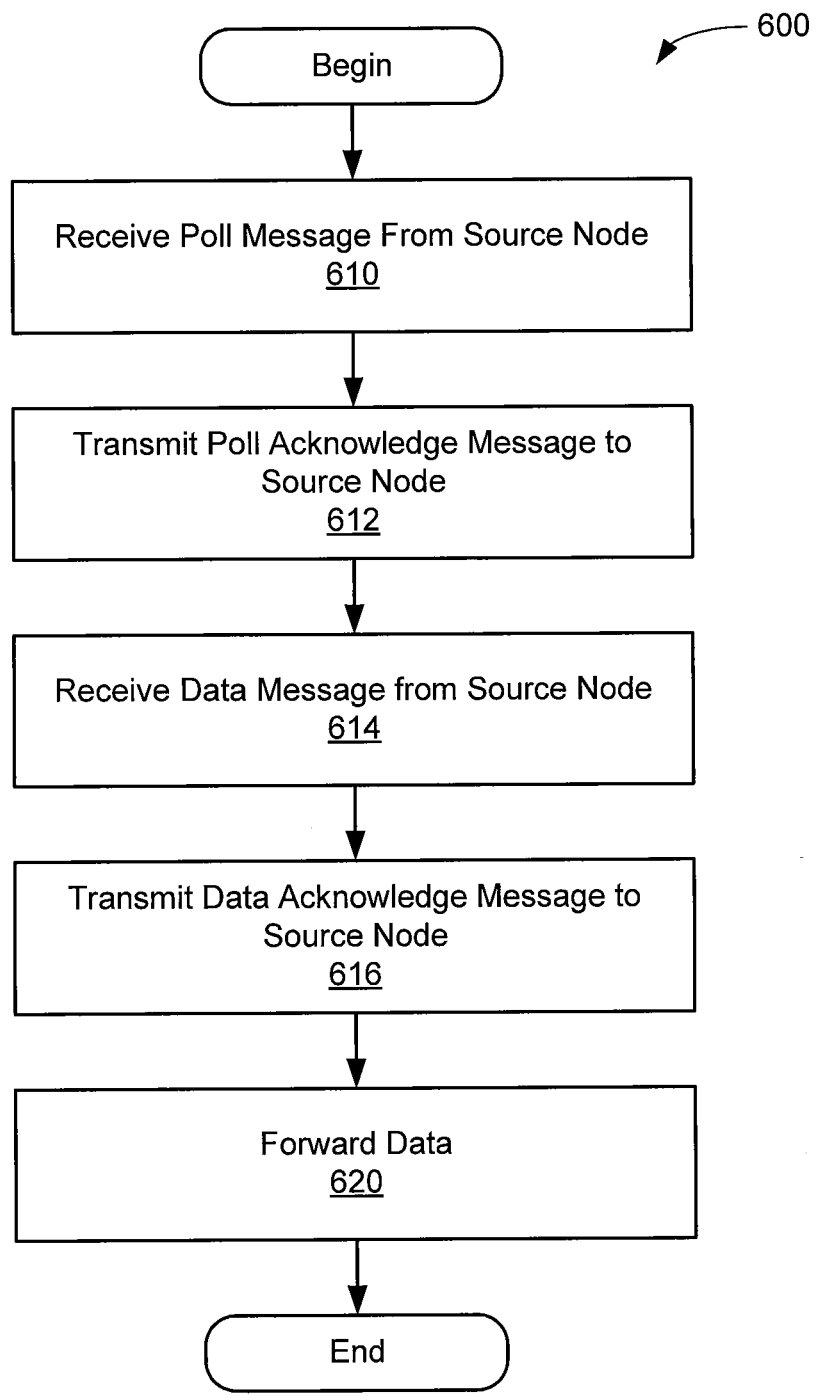
FIG. 6 is a flow diagram of method steps for receiving payload data via the four step communications protocol, according to one embodiment of the present invention.

FIG. 6 is a flow diagram of method steps 600 for receiving payload data via the four step communications protocol, according to one embodiment of the present invention. Although the method steps are described in conjunction with the systems of FIGS. 1 and 2, persons skilled in the art will understand that any system configured to perform the method steps, in any order, is within the scope of the present invention. This method may be performed by the digital radio transceiver 200 or any technically feasible radio transceiver system.

The method begins in step 610, where a transmission target, such as an intermediate node 130 of FIG. 1, receives an incoming message that is then identified as a poll message based on an inspection of payload data for the incoming message. In one embodiment, the payload data is organized as an IP packet. The incoming message may be received according to the method steps 700 of FIG. 7, below. The poll message may comprise poll message 420 of FIG. 4A, from a source node, such as source node 110. In one embodiment, two or more poll messages may be received simultaneously on different channels from different source nodes. In step 612, the transmission target transmits a poll acknowledgment message, such as poll acknowledgment message 422, to the source node. In scenarios where two or more poll messages are received, the transmission target may acknowledge each poll message, either sequentially or simultaneously. In one embodiment, the poll acknowledgement message includes local channel noise and occupancy information measured by the transmission target. In certain embodiments, the poll acknowledgement message includes availability data that indicates when, if at all, the transmission target will be able to accept a data message. In step 614, the transmission target receives a data message, such as data message 440, from the source node. In one embodiment the data message comprises an IP packet or an IP packet fragment. In step 616, the transmission target transmits a data acknowledgment message, such as data acknowledgment message 442, to the source node. In step 620, the transmission target forwards the data message to another node, such as another intermediate node 130 or a destination node 112. Forwarding the data message comprises selecting one or more target nodes and then transmitting payload data to the one or more target nodes. Any technically feasible technique may be used to select the one or more target nodes, which may each comprise a next hope for delivering the payload data to a destination node, such as destination node 112. In one embodiment, the transmission target performs the method steps 500 of FIG. 5 to transmit payload data being forwarded to the one or more target nodes. Similarly, the transmission target may perform the method steps 500 of FIG. 5 to transmit the poll acknowledgement message and the data acknowledgement message. The method terminates in step 620.

Figure 7:
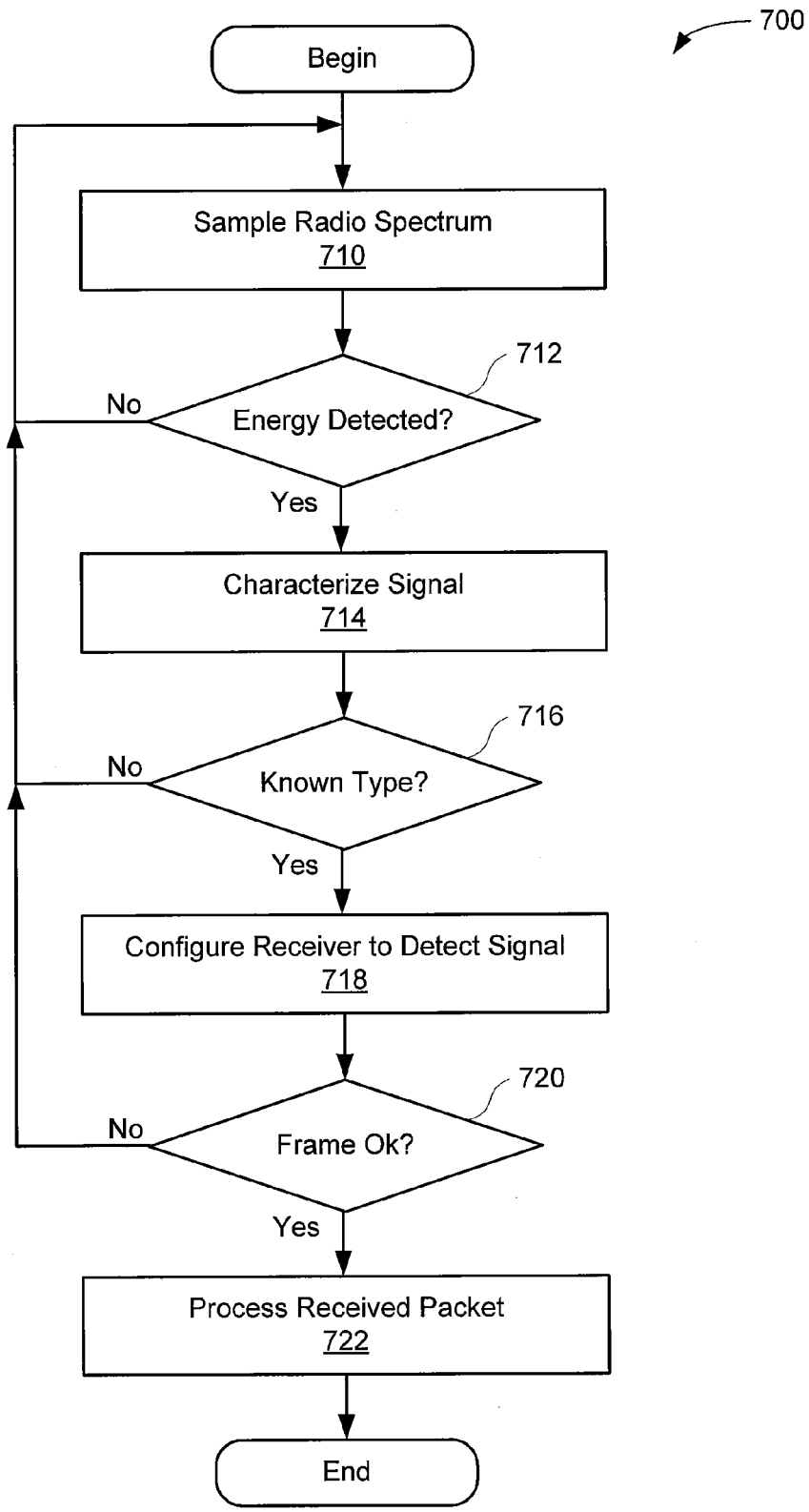
FIG. 7 is a flow diagram of method steps for receiving payload data via one of a plurality of radio frequency channels, according to one embodiment of the present invention.

FIG. 7 is a flow diagram of method steps 700 for receiving payload data via one of a plurality of radio frequency channels, according to one embodiment of the present invention. Although the method steps are described in conjunction with the systems of FIGS. 1 and 2, persons skilled in the art will understand that any system configured to perform the method steps, in any order, is within the scope of the present invention. This method may be performed by the digital radio transceiver 200 or any technically feasible radio transceiver system.

The method begins in step 710, where the digital radio transceiver samples radio spectrum, such as radio spectrum corresponding to the receive channels, such as receive channels 330 of FIG. 3A. If, in step 712, energy is detected within the receive channels, then the method proceeds to step 714, where the digital radio transceiver characterizes a signal within the receive channels.

If, in step 716, a signal type for the signal is known, then the method proceeds to step 718, where receiver circuits within the digital radio transceiver are configured to detect the signal within the receive channels. The configuration may specify, without limitation, a type of modulation, a bit rate, and one or more filtering options.

If, in step 720, a frame of payload data is received intact, then the method proceeds to step 722, where the digital radio transceiver processes the received packet. In one embodiment the packet is an IP packet and is processed by the MPU 210 of FIG. 2. The method terminates in step 722.

Returning to step 712, if no energy is detected within the receive channels, then the method proceeds back to step 710.

Returning to step 716, if the signal type is not known, then the method proceeds back to step 710.

Returning to step 720, if the frame of payload data is not received intact, then the method proceeds back to step 710.

The method steps 700 may be performed independently and concurrently for each channel within the set of receive channels.

In sum, a technique for frequency hopping spread spectrum transmission is disclosed. A multi-channel receiver is configured to listen to multiple channels simultaneously, enabling the receiver to detect incoming data from an arbitrary hop sequence without prior synchronization with the transmitter. In a wireless mesh network, this capability advantageously enables each node to participate more efficiently in transmitting data within the wireless mesh network.

One advantage of the disclosed systems and methods is that latency and delivery probability are improved within a wireless mesh network. In particular, frequency hopping spread spectrum efficiency is improved in the wireless mesh network.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A method for forwarding a packet of data within a wireless network from a source node to a destination node via an intermediate node, the method comprising:
   receiving from a first source node that requests availability information for the intermediate node a first poll message via a first channel within a channel group;
   transmitting to the first source node a first acknowledgement message that includes the availability information for the intermediate node via a second channel in the channel group;
   receiving from the first source node via a third channel in the channel group a first data message that includes a first set of payload data to be forwarded to a first destination node;
   transmitting to the first source node a first data-acknowledge message that indicates successful receipt of the first data message via a fourth channel in the channel group;
   forwarding the first set of payload data to the first destination node; and
   concurrently transmitting data to a second source node on any available channel in the channel group while forwarding the first set of payload data to the first destination node, or
   concurrently receiving data from the second source node on any available channel in the channel group while forwarding the first set of payload data to the first destination node,
   wherein the channel group comprises four or more channels within a plurality of allocated channels, and
   wherein the available channel in the channel group comprises one of the first channel, the second channel, the third channel, and the fourth channel.

2. The method of claim 1, further comprising:
   concurrently receiving from the second source node a second poll message via a fifth channel within the channel group;

transmitting to the second source node a second acknowledgement message that includes the availability information for the intermediate node via a sixth channel;
receiving from the second source node a second data message; and
transmitting to the second source node a second data-acknowledge message that indicates successful receipt of the second data message.

3. The method of claim 2, wherein the first data-acknowledge message and the second data-acknowledge message comprise one aggregated data-acknowledge message.

4. The method of claim 1, wherein the first acknowledgement message includes a time value that indicates when the intermediate node is available to receive the first data message.

5. The method of claim 1, wherein the first data-acknowledge message includes a noise measurement associated with the first channel that is sampled by the intermediate node.

6. The method of claim 1, wherein the second channel is selected based on historical success statistics for transmission on each channel associated with the channel group as well as local regulatory requirements.

7. The method of claim 1, wherein forwarding payload data to the destination node comprises:
selecting a first destination node based on information residing in a forwarding database maintained by the intermediate node; and
transmitting to the first destination node the first set of payload data.

8. The method of claim 7, further comprising:
selecting a second destination node based on information residing in the forwarding database; and
transmitting to the second destination node a second set of payload data.

9. The method of claim 8, wherein the first set of payload data and at least a portion of the second set of payload data are transmitted simultaneously on different channels.

10. The method of claim 9, wherein the first destination node and the second destination node comprise the same node.

11. The method of claim 8, wherein selecting channels for transmitting data to each destination node is based on historical success statistics for transmission within each channel associated with the channel group as well as local regulatory requirements.

12. The method of claim 1, wherein the channel group comprises each channel included in the plurality of allocated channels.

13. The method of claim 1, wherein the plurality of allocated channels comprises at least one spectral gap between two adjacent channels.

14. The method of claim 1, wherein the availability information includes an availability attribute indicating that the intermediate node is not available to accept data at a current time, and will be available to accept data at, or after, a later time.

15. The method of claim 1, wherein the available channel in the channel group comprises a fifth channel in the channel group.

16. The method of claim 1, further comprising generating the channel group by:
selecting a center channel that defines a range of channels; and
identifying a subset of channels from within the plurality of allocated channels that is included in the range of channels.

17. The method of claim 16, wherein each channel in the range of channels is associated with a bandwidth that is adjacent on a frequency spectrum to a bandwidth associated with at least one other channel in the range of channels.

18. The method of claim 1, wherein the first set of payload data is forwarded to the first destination node on a different channel than the available channel in the channel group.

19. A non-transitory computer-readable storage medium including instructions that, when executed by a signal processing unit, cause the signal processing unit to forward a packet of data within a wireless network from a source node to a destination node via an intermediate node by performing the steps of:
receiving from a first source node that requests availability information for the intermediate node a first poll message via a first channel within a channel group;
transmitting to the first source node a first acknowledgement message that includes the availability information for the intermediate node via a second channel in the channel group;
receiving from the first source node via a third channel in the channel group a first data message that includes a first set of payload data to be forwarded to a first destination node;
transmitting to the first source node a first data-acknowledge message that indicates successful receipt of the first data message via a fourth channel in the channel group;
forwarding the first set of payload data to the first destination node; and
concurrently transmitting data to a second source node on any channel in the channel group while forwarding the first set of payload data to the first destination node, or
concurrently receiving data from the second source node on any channel in the channel group while forwarding the first set of payload data to the first destination node,
wherein the channel group comprises four or more channels within a plurality of allocated channels, and
wherein the available channel in the channel group comprises one of the first channel, the second channel, the third channel, and the fourth channel.

20. The non-transitory computer-readable storage medium of claim 19, further comprising:
concurrently receiving from the second source node a second poll message via a fifth channel within the channel group;
transmitting to the second source node a second acknowledgement message that includes the availability information for the intermediate node via a sixth channel;
receiving from the second source node a second data message; and
transmitting to the second source node a second data-acknowledge message that indicates successful receipt of the second data message.

21. The non-transitory computer-readable storage medium of claim 20, wherein the first data-acknowledge message and the second data-acknowledge message comprise one aggregated data-acknowledge message.

22. The non-transitory computer-readable storage medium of claim 19, wherein forwarding payload data to the destination node comprises:
selecting a first destination node based on information residing in a forwarding database maintained by the intermediate node; and
transmitting to the first destination node the first set of payload data.

23. The non-transitory computer-readable storage medium of claim 22, further comprising:
selecting a second destination node based on information residing in the forwarding database; and
transmitting to the second destination node a second set of payload data.

24. The non-transitory computer-readable storage medium of claim 23, wherein the first set of payload data and at least a portion of the second set of payload data are transmitted simultaneously on different channels.

25. The non-transitory computer-readable storage medium of claim 23, wherein selecting channels for transmitting data to each destination node is based on historical success statistics for transmission within each channel associated with the channel group as well as local regulatory requirements.

26. The non-transitory computer-readable storage medium of claim 19, wherein the channel group comprises each channel included in the plurality of allocated channels.

27. The non-transitory computer-readable medium of claim 19, wherein the availability information includes an availability attribute indicating that the intermediate node is not available to accept data at a current time, and will be available to accept data at, or after, a later time.

28. A wireless network device configured to forward a packet of data from a source node to a destination node via an intermediate node within a wireless network, comprising:
a radio transceiver circuit configured to:
receive an incoming radio signal comprising a plurality of simultaneously monitored channels; and
transmit an outbound radio signal comprising a transmitter channel; and
a signal processing unit that is coupled to the radio transceiver circuit and configured to:
receive from a first source node that requests availability information for the intermediate node a first poll message via a first channel within a channel group;
transmit to the first source node a first acknowledgement message that includes the availability information for the intermediate node via a second channel in the channel group;
receive from the first source node via a third channel in the channel group a first data message that includes a first set of payload data to be forwarded to a first destination node;
transmit to the first source node a first data-acknowledge message that indicates successful receipt of the first data message via a fourth channel in the channel group;
forward the first set of payload data to the first destination node; and
concurrently transmit data to a second source node on any channel in the channel group while forwarding the first set of payload data to the first destination node, or
concurrently receive data from the second source node on any channel in the channel group while forwarding the first set of payload data to the first destination node,
wherein the channel group comprises four or more channels within a plurality of allocated channels, and
wherein the available channel in the channel group comprises one of the first channel, the second channel, the third channel, and the fourth channel.

29. The wireless network device of claim 28, wherein the signal processing unit is further configured to:
concurrently receive from the second source node a second poll message via a fifth channel within the channel group;
transmit to the second source node a second acknowledgement message that includes the availability information for the intermediate node via a sixth channel;
receive from the second source node a second data message; and
transmit to the second source node a second data-acknowledge message that indicates successful receipt of the second data message.

30. The wireless network device of claim 29, wherein the first data-acknowledge message and the second data-acknowledge message comprise one aggregated data-acknowledge message.

31. The wireless network device of claim 29, wherein the availability information includes an availability attribute indicating that the intermediate node is not available to accept data at a current time, and will be available to accept data at, or after, a later time.

32. The wireless network device of claim 28, wherein to forward payload data to the destination node, the signal processing unit is configured to:
select a first destination node based on information residing in a forwarding database maintained by the intermediate node; and
transmit to the first destination node the first set of payload data.

33. The wireless network device of claim 32, wherein the signal processing unit is further configured to:
select a second destination node based on information residing in the forwarding database; and
transmit to the second destination node a second set of payload data.

34. The wireless network device of claim 33, wherein the first set of payload data and at least a portion of the second set of payload data are transmitted simultaneously on different channels.

35. The wireless network device of claim 33, wherein selecting channels for transmitting data to each destination node is based on historical success statistics for transmission within each channel associated with the channel group as well as local regulatory requirements.

36. The wireless network device of claim 28, wherein the channel group comprises each channel included in the plurality of allocated channels.

* * * * *